United States Patent [19]

Cameron et al.

[11] 4,100,692
[45] Jul. 18, 1978

[54] UNDERWATER PROTECTION DEVICE

[76] Inventors: Larry D. Cameron, 16690 W. 11th Ave., Golden, Colo. 80401; Albert W. Jacque, 1600 Balsam St., Lakewood, Colo. 80215

[21] Appl. No.: 821,081

[22] Filed: Aug. 2, 1977

[51] Int. Cl.² .......................................... F41C 27/00
[52] U.S. Cl. ...................................................... 42/1 L
[58] Field of Search ........................................ 42/1 L

[56] References Cited

U.S. PATENT DOCUMENTS

| 3,145,494 | 8/1964 | Willcox et al. | 42/1 L |
| 3,210,877 | 10/1965 | Liberatore | 42/1 L |
| 3,300,888 | 1/1967 | Belcher et al. | 42/1 L |
| 3,545,117 | 12/1970 | Van Voorhees | 42/1 L |
| 3,553,876 | 1/1971 | Engler | 42/1 L |
| 3,580,172 | 5/1971 | Hendricks | 42/1 L |
| 3,721,031 | 3/1973 | Falterman et al. | 42/1 L |

Primary Examiner—Charles T. Jordan
Attorney, Agent, or Firm—Horace B. Van Valkenburgh; Frank C. Lowe

[57] ABSTRACT

An open ended, cylindrical barrel which carries a shell, is pushed into a housing until a single cam passes the position of a shoulder, whereupon the barrel may be twisted to lock it in position. A firing pin is spring pressed and presses slightly against the rear end of the shell, to hold the barrel in an outward position and also insure adequate impingement of the firing pin against the shell when the device is used. This slight pressure of the firing pin maintains the shell and barrel in an axially extended position, thereby insuring that the rearward movement of the barrel and shell, on impact with a shark or other menace, will cause the shell to detonate. The shell and housing are attached to a pole comprising a simple tube, the length of which may be varied, without affecting the use or operation of the device.

10 Claims, 10 Drawing Figures

U.S. Patent July 18, 1978 Sheet 1 of 2 4,100,692
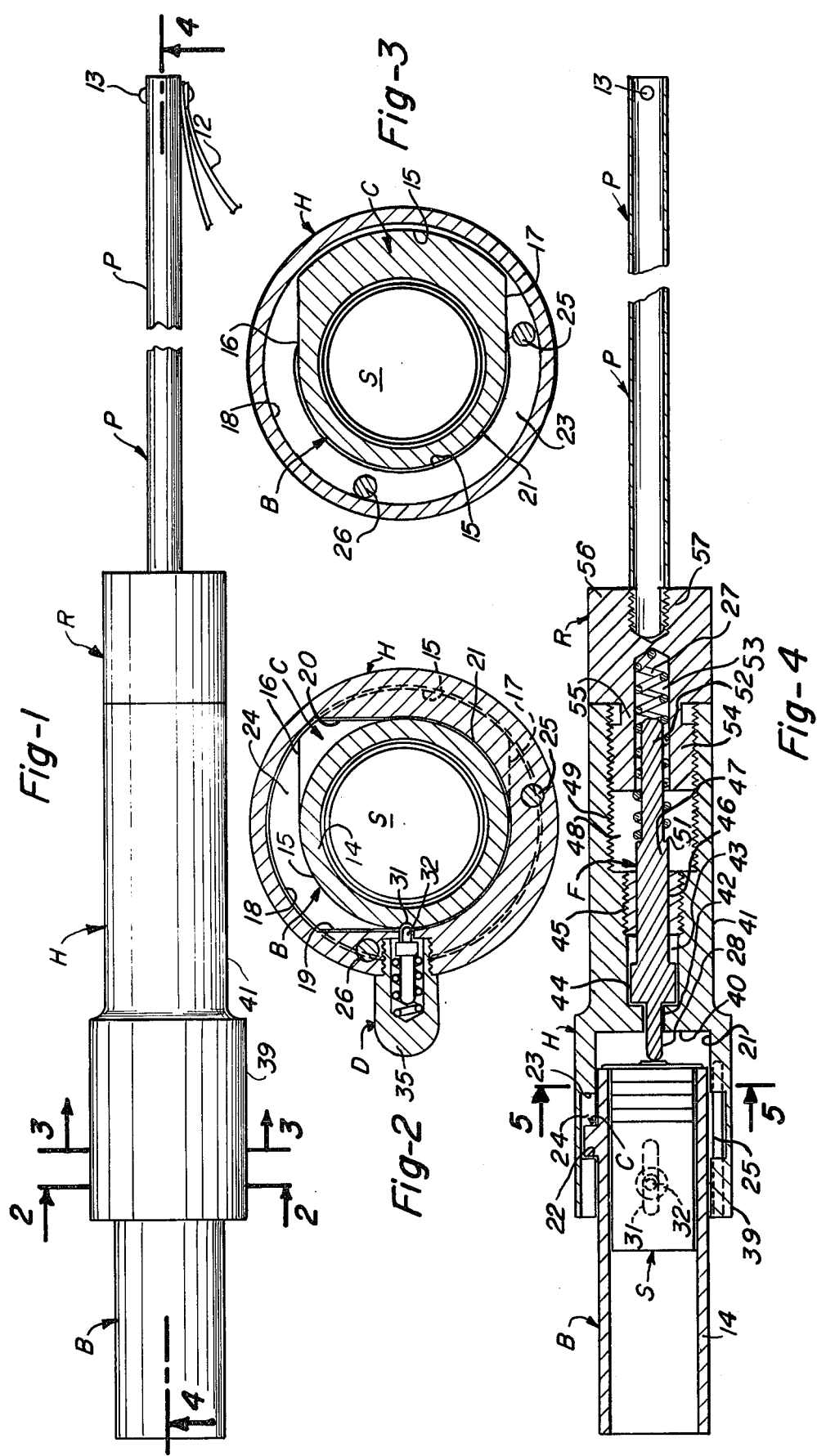

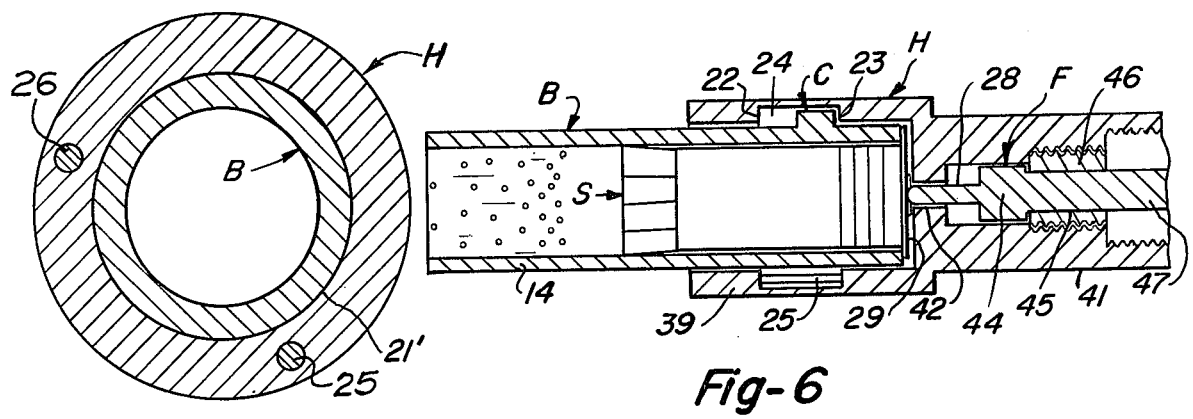
Fig-5
Fig-6
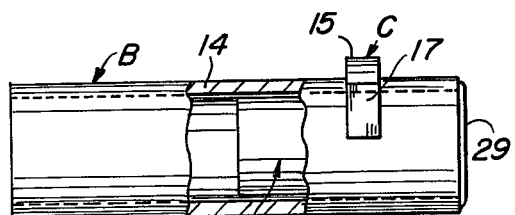
Fig-7
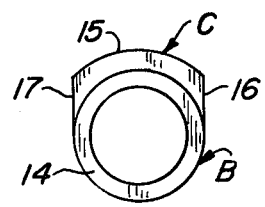
Fig-8
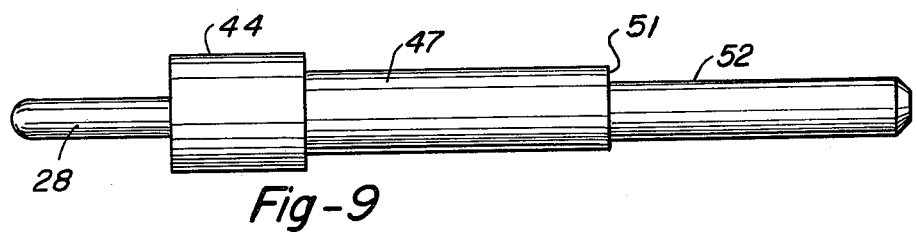
Fig-9
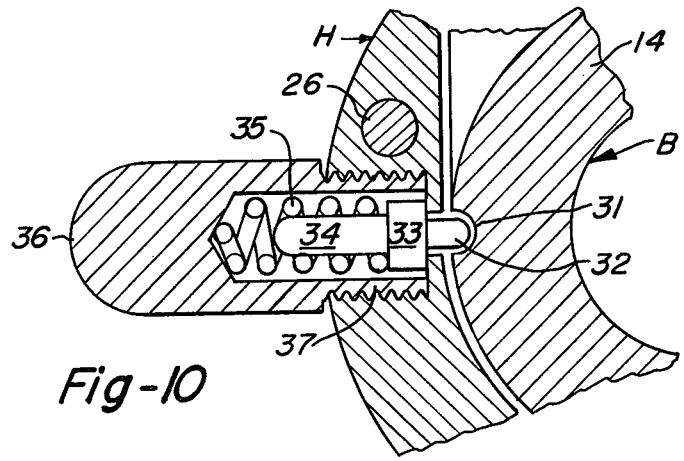
Fig-10

UNDERWATER PROTECTION DEVICE

This invention relates to an underwater protection device, particularly those which are useable to kill a dangerous fish, such as a shark, or other water inhabitant.

When a scuba diver or an underwater workman encounters a shark, it is sometimes necessary to kill the shark in order to prevent serious injury or death to the diver. Also, if one shark is killed, then other sharks may be attracted to the area through the blood spill of the first shark killed. Thus, it is not only necessary for a user of an underwater protection device to conveniently kill a shark, but also to be able to reload the device quickly and easily. Shotgun shells have become quite popular for use in underwater devices for this purpose, particularly when the device is pushed against the body of a shark, since the explosion of the shell will penetrate the shark's skin without difficulty and not only the pellets but the gases produced by firing will spread within the shark's body. While several prior devices are adequate for an encounter with one shark, reloading is a time consuming process. Thus, as in U.S. Pat. Nos. 3,145,494 and 3,580,172, a holder for the shell must be unscrewed, the old shell removed, a new shell inserted and the holder must be screwed back onto the end of the device. This involves not only the delay in starting the threads, but also the delay in turning the holder into the threads. A further disadvantage of the former is that it is quite short and depends upon release of a spring pressed rod to impact against the firing pin, but this involves two disadvantages. One is that the approach to the shark must be so close as to endanger the diver before the device can be fired, or if the device is fired from a distance, the water, sometimes of a relatively high density, may provide an effective resistance to the accurate movement, between the device and the shark, of the pellets. A further disadvantage of the latter is that the firing pin is mounted on a weight which, through inertia, is designed to be propelled forwardly toward the cartridge when the device is moved toward a fish, but then stopped by engagement with the fish. However, the chamber in which the weight is located is likely to fill with water, in which case, the inertia of the weight may not be sufficient to propel it forwardly through the water with the production of a sufficient force to fire the cartridge.

Other underwater protection devices have various disadvantages. For instance, in U.S. Pat. No. 3,553,876, a rotatable head, locked into position by alternately spaced lugs, may be twisted for unlocking and then moved forwardly to uncover a slot from which the cartridge may be dropped. Next, the new cartridge is inserted in the slot and moved into the head, then the head relocked. In this construction, the firing pin is actuated by an elongated spring pressed rod which extends to the handle of the device. By turning the handle to clear it from a safe position, the handle can be pushed forwardly while the tube is held, to actuate the firing pin, but the motions required to fire the device detract from the ability to aim the gun. Since the best results are obtained with the end of the device pressed against a shark, the necessity to wait to fire the device may result in a miss, either through firing the device too early or too late.

The present invention has been developed with the desired result in view of overcoming the disadvantages of prior underwater protection devices. Thus, among the objects of this invention are to provide an underwater protection device which will be fired in a simple manner, upon contact with a shark or the like which is either moving toward the operator or against which the operator is able to push the device, and also provide a mechanism in which a new shell may be substituted for a used shell quickly and readily; to provide such a device in which the shell is forced back against the firing pin by movement of a shell barrel at the extreme end of the device through engagement with the body of a shark or the like, so that a simple manipulation only is required to fire the device; to provide such a device which is simple in construction and readily manufactured; and to provide such a device which will be efficient and effective in operation.

The device of this invention essentially includes an open ended barrel which carries a shell, the barrel being pushed into a housing until a single cam passes the position of a shoulder, whereupon the barrel may be twisted to lock it in position, so that the manipulation to reload is simple. The firing pin is spring pressed and compressed slightly by the rear end of the shell. This slight pressure of the firing pin maintains the shell and barrel in an axially extended position, thereby insuring that the rearward movement of the barrel and shell, on impact with a shark, will cause the shell to detonate. The shell and housing are attached to a pole comprising a simple tube, the length of which may be varied, without affecting the use or operation of the device.

The foregoing and additional objects, as well as details of construction, will become apparent from the description which follows, taken in conjunction with the accompanying drawings, in which:

FIG. 1 is a condensed side elevation of an underwater protection device embodying this invention.

FIG. 2 is a cross section, on an enlarged scale, taken along line 2—2 of FIG. 1.

FIG. 3 is a similar cross section taken along line 3—3 of FIG. 1.

FIG. 4 is a longitudinal section taken along line 4—4 of FIG. 1.

FIG. 5 is a cross section, on an enlarged scale, taken along line 5—5 of FIG. 4.

FIG. 6 is a fragmentary longitudinal section corresponding to a portion of FIG. 4, but illustrating certain parts in a different position, i.e. when a rotationally locked barrel is forced rearwardly to fire the shell.

FIG. 7 is a side elevation of the locking barrel, partially broken away to show a shell inside.

FIG. 8 is an end view of the locking barrel.

FIG. 9 is a side elevation, on an enlarged scale, of a firing pin.

FIG. 10 is a fragmentary section corresponding to a portion of FIG. 2, but on an enlarged scale, illustrating particularly a detent which holds the locking barrel in an operative position.

The underwater protection device of this invention may include a barrel B, as in FIGS. 1 and 4, in which a shell S, preferably a shotgun shell, is placed. A housing H receives the rear end of the barrel B and is interlocked therewith, through a cam C on the barrel. As in the manner described below, a spring pressed firing pin F engages the rear end of the shell, but without sufficient force to activate the shell. However, when the barrel B is pressed against a shark, or a shark presses against it, the barrel B and shell S will be driven rearwardly, as in FIG. 6, to fire the shell through the firing pin F. A spring retainer R is attached to the housing H and also receives a handle or pole P which may be a lightweight piece of tubing, such as aluminum. The pole may be on the order of 6 to 8 feet in length, but shorter or longer poles may be utilized, if desired. At its inner end, the pole may be provided with a strap 12 which forms a loop for placement around the wrist of the user, being attached by a pin 13.

The barrel B has a cylindrical side wall 14 which is cylindrical on the inside and also cylindrical on the outside, except for a laterally extending cam C, having an outer arcuate edge 15 and parallel sides 16 and 17. Edge 15 may extend for an arc of 90° to 105° and have a curvature corresponding to an inner arcuate surface 18 of housing H, but providing clearance therefrom. The outer end of the cylindrical housing H includes a portion of the arcuate surface 18, as in FIG. 2, as well as flat surfaces 19 and 20 corresponding to the flat surfaces 16 and 17 of the cam. The flat surfaces 19 and 20, on the inside, merge with an arcuate surface 21 which corresponds to the outer cylindrical surface of the barrel. Thus, the surface 18, together with the surfaces 19, 20 and 21, extend to the outer end of the housing and provide a channel for axial insertion of the barrel, including cam C. Surfaces 19, 20 and 21 extend axially to a shoulder 22, as in FIG. 4, which, with an annular shoulder 23 spaced therefrom, provides an annular space 24. Below shoulder 23, a cylindrical surface 21' having the same radius as surface 21 accommodates the diameter of barrel B below the cam C. As the barrel is inserted, when cam C passes shoulder 22, indicated by the rear end of the shell engaging the firing pin F, the barrel B may be turned to move the cam C beneath the shoulder, into the space 24 and to the position of FIGS. 2, 3 and 4. In order to prevent the cam from turning too far beneath shoulder 22, a stop pin 25 of FIGS. 2-4 may extend through the space 24, as in FIG. 4, between shoulders 22 and 23. As will be evident, abutment of edge 17 of cam C against the pin 25 will prevent further movement of the cam in a clockwise direction. Also, in order to prevent the cam from being rotated in the wrong direction, a similar pin 26, as in FIGS. 2 and 3, will abut against cam edge 16, if the cam is accidentally turned in the wrong direction.

A coil spring 27 urges a front stem 28 of the firing pin F outwardly into engagement with the rear end of shell S, which has a rim 29 to engage the rear end of barrel B. Thus, the pressure of coil spring 27 against the firing pin F will hold the barrel B and the shell S in the position of FIG. 4, in which the cam C abuts the underside of shoulder 22. However, the pressure of spring 27 pressing firing pin stem 28 against the rear of shell S is considerably less than the impact necessary to fire the shell. In the locked position, a longitudinal notch 31, in the outside of the barrel directly opposite the cam C, as in FIGS. 2 and 10, extends for a sufficient distance that a detent pin 32 will continue to engage the notch, as the barrel moves longitudinally from the position of FIG. 4 to the position of FIG. 6. The detent pin may be integral with a boss 33 and a stem 34, with a coil spring 35 surrounding the stem and pressing against the boss within a suitable cavity in a detent housing 36, which is removably attached to housing H by threads 37. As will be evident, the engagement of detent pin 32 with the notch 31 will maintain the barrel in locked lateral position, even though subsequent to firing, the barrel is moved again to its initial position of FIG. 4, through the pressure of spring 27 exerted through firing pin F.

As will be evident, it is very simple to remove the barrel B, after a shell is fired, merely by twisting the barrel through 90°, whereupon it may be lifted out of the outer end of the housing H and the spent shell removed, then a new shell S having a rear rim 29 to engage the rear end of the barrel B may be slipped into place. Then, the barrel may be reinserted in the end of the housing, pushed downwardly and twisted 90° in a clockwise direction until the detent clicks to a locking position. The gun is then ready for another firing. It will be understood that the position of stop pins 25 and 26 may be reversed, to permit the barrel to be locked by twisting in a counterclockwise direction.

The housing H is provided with a larger forward portion 39, within which is a barrel chamber, i.e. a cavity which receives the barrel B, which is surrounded by surface 21' and extends to a transverse end wall 40. The housing also has a rear portion 41 of reduced size, in which the firing pin F is principally disposed. The front extension 28 of the firing pin extends through a hole 42 in a web which extends across the front end of a cavity 43 within which moves a cylindrical guide section 44 of pin F. Rearwardly in the cavity 43 is a threaded section 45, into which a spool 46 is threaded, this spool having an inner bore to receive a stem 47 of the firing pin, while disposed on the outside are threads for engaging the threaded section 45. A rear cavity 48 is provided with threads 49, while stem 47 extends to a shoulder 51 which forms an abutment for coil spring 27. A smaller stem 52 extends from shoulder 51 inwardly within the spring 27 and within a passage 53 in the spring retainer R. A front block or head 54 of retainer R is provided with threads on the outside, to engage the threads 49 of cavity 48. Head 54 of the spring retainer is connected by a neck 55 to a rear block 56 having at the rear center a tapped hole 57, adapted to receive the threaded outer end of pole P.

From the foregoing, it will be evident that the objects and requirements previously set forth have been fulfilled to a marked degree. Thus, the forward position of the barrel B insures that the barrel move the shell against the firing pin as a shark or the like moves against the barrel or vice versa. The detent and longitudinal groove in the barrel maintain the barrel in a desired radial position during and after firing and thereby assists in simplifying the substitution of a new shell for the spent shell, as in the manner described above.

Although a preferred embodiment of this invention has been illustrated and described, other embodiments may exist and various changes may be made, without departing from the spirit and scope of this invention.

What is claimed is:

1. An underwater protection device comprising, in combination:

a generally cylindrical barrel having outer, laterally extending cam means and a bore for receiving a shell, with a rear rim of said shell abutting the rear end of said barrel;

a housing for receiving said barrel axially, having reception means for movement of said barrel inwardly into said housing and having interlocking means for restraining said barrel against outward movement but permitting inward movement to a predetemined extent;

said housing having means for constraining said barrel to longitudinal movement when so interlocked; and firing pin means for engaging the rear end of said shell to maintain said barrel in an outward interlocked position and for firing said shell upon impact of the outer end of said barrel with a water inhabitant, resulting in inward longitudinal movement of said barrel.

2. An underwater protection device as defined in claim 1, including:

resilient means for urging said firing pin means toward said shell.

3. An underwater protection device as defined in claim 1, wherein:

said cylindrical barrel has, on the outside, a single laterally extending cam provided with an arcuate outer surface and parallel sides.

4. An underwater protection device as defined in claim 2, wherein:

said housing is provided with inner surfaces corresonding in contour to the edges of said cam and also the cylindrical surface of said barrel between the sides of said cam, said surfaces extending inwardly from the outer end of said housing; and said housing further has spaced shoulders providing a recess within which said cam may be moved circumferentially by twisting said barrel, when said barrel has been inserted in said housing a distance causing said cam to move beneath the outermost of said shoulders.

5. An underwater protection device as defined in claim 4, wherein:

said housing is provided with longitudinally extending pins spanning the space below said outermost shoulder and adapted to restrict a cam to movement to a position beneath said outer shoulder.

6. An underwater protection device as defined in claim 2, including:

a groove extending longitudinally of said barrel opposite said cam; and a detent pin mounted on said housing and resiliently pressed into engagement with said barrel groove for constraining said barrel to longitudinal movement.

7. An underwater protection device as defined in claim 2, wherein:

said firing pins means includes a firing pin movable longitudinally within said housing and extending rearwardly to a chamber in which a spring surrounds a rear stem of said firing pin, with a front stem of said firing pin extending into engagement with the rear end of said shell and pressed against said shell by a spring, said spring abutting against an intermediate shoulder on said firing pin.

8. An underwater protection device as defined in claim 1, including:

an elongated handle connected with said housing for moving said barrel into position for engagement with a water inhabitant.

9. An underwater protection device as defined in claim 8, including:

a spring received by a retainer connected to the rear end of said housing, said spring urging said firing pin forwardly in said housing.

10. An underwater protection device as defined in claim 9, wherein:

said firing pin is provided with an axially extending front stem and an enlarged cylindrical guide portion rearwardly of said stem and an elongated guide stem rearwardly of said enlarged portion, said rearward stem providing a shoulder against which one end of said spring abuts.

* * * * *